(12) United States Patent
Nakai (10) Patent No.: US 11,279,301 B2
(45) Date of Patent: Mar. 22, 2022

(54) WIRE HARNESS WITH PIPE AND FLEXIBLE HOLDER THAT HOLDS AN ELECTRIC WIRE

(71) Applicant: SUMITOMO WIRING SYSTEMS, LTD., Yokkaichi (JP)

(72) Inventor: Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/054,932

(22) PCT Filed: Apr. 25, 2019

(86) PCT No.: PCT/JP2019/017541
§ 371 (c)(1),
(2) Date: Nov. 12, 2020

(87) PCT Pub. No.: WO2019/220905
PCT Pub. Date: Nov. 21, 2019

(65) Prior Publication Data
US 2021/0291757 A1     Sep. 23, 2021

(30) Foreign Application Priority Data

May 16, 2018     (JP) .............................. JP2018-094703

(51) Int. Cl.
*B60R 16/02*     (2006.01)
*H01B 7/00*     (2006.01)

(52) U.S. Cl.
CPC ....... *B60R 16/0215* (2013.01); *H01B 7/0045* (2013.01)

(58) Field of Classification Search
CPC ... B60R 16/0215; B60R 16/02; H01B 7/0045; H01B 7/00; H02G 3/04
(Continued)

(56) References Cited

U.S. PATENT DOCUMENTS 9,520,214 B2     12/2016 Nakai et al.
9,558,866 B2 *   1/2017 Shiga ..................... H02G 3/06
(Continued)

FOREIGN PATENT DOCUMENTS

JP     2015-220006 A     12/2015
JP     2016-092250 A     5/2016
(Continued)

OTHER PUBLICATIONS

Jul. 9, 2019 International Search Report issued in International Patent Application No. PCT/JP2019/017541.

*Primary Examiner* — Timothy J Thompson
*Assistant Examiner* — Michael F McAllister
(74) *Attorney, Agent, or Firm* — Oliff PLC (57) ABSTRACT

A wire harness, wherein: the holder surrounds the electric wire and is inserted into the end of the pipe, a groove extending along a circumferential direction of the holder and facing an inner circumferential surface of the pipe is provided on an outer circumferential surface of the holder, and the end of the pipe is crimped and the holder is flexurally deformed, whereby the inner circumferential surface of the pipe and the outer circumferential surface of the holder are brought into intimate contact with each other, and an inner circumferential surface of the holder and an outer circumferential surface of the electric wire are brought into intimate contact with each other, a crimped portion of the end of the pipe being reduced in diameter inward in a radial direction of the pipe and being engaged with the groove of the holder.

9 Claims, 4 Drawing Sheets

(58) Field of Classification Search
USPC .................................................... 174/72 A
See application file for complete search history.

(56) References Cited

U.S. PATENT DOCUMENTS

| | | | |
|---|---|---|---|
| 10,128,027 B2 | 11/2018 | Nakai et al. | |
| 10,299,417 B2* | 5/2019 | Yamasaki | H01R 9/0518 |
| 2010/0181728 A1* | 7/2010 | Thompson | H02G 3/22 |
| | | | 277/314 |
| 2015/0334882 A1 | 11/2015 | Sugino | |
| 2016/0126709 A1 | 5/2016 | Maeda | |
| 2016/0134090 A1 | 5/2016 | Kushima | |

FOREIGN PATENT DOCUMENTS

| | | |
|---|---|---|
| JP | 2016-092979 A | 5/2016 |
| JP | 6057176 B2 | 1/2017 |

* cited by examiner

WIRE HARNESS WITH PIPE AND FLEXIBLE HOLDER THAT HOLDS AN ELECTRIC WIRE

BACKGROUND

The present disclosure relates to a wire harness including a holder that holds an electric wire with respect to a pipe.

Conventionally, some wire harnesses routed in a vehicle or the like include an electric wire and a metal shield pipe through which the electric wire is inserted. An end portion of the electric wire is drawn out from an end portion of the shield pipe and connected to a device. Some of such wire harnesses include a holder that is attached to the shield pipe to cover an end edge of the shield pipe, protects the electric wire, and restricts the length of the electric wire drawn out (see JP 6057176B, for example). The holder described in JP 6057176B includes a cylindrical main body portion that is internally fitted to an end portion of the shield pipe and through which the electric wire is inserted, and a holding piece that extends from the end portion of the main body portion toward the outside of the shield pipe in the drawn out direction of the electric wire. The electric wire drawn out from the main body portion is held by taping or the like with respect to the holding piece, whereby the length of the electric wire drawn out from the shield pipe is regulated. Also, a projection is provided on the outer circumferential surface of the main body portion, and the projection is engaged with a mounting hole on the circumferential wall of the shield pipe to prevent the holder from coming off the shield pipe. According to such a holder, because the end edge of the shield pipe is covered by the holder, and the electric wire is held by the holding piece of the holder, the electric wire is prevented from coming into contact with the end edge of the shield pipe. With this configuration, damage to the electric wire due to coming into contact with the shield pipe is inhibited.

SUMMARY

In the wire harness described in JP 6057176B, the electric wire is held by the holding piece of the holder that extends outward from an end edge of the shield pipe. Accordingly, when the wire harness is routed, for example, in a case where it is necessary to bend the electric wire drawn out from the end edge of the shield pipe, the routing path may be restricted. Also, in the wire harness described in JP 6057176B, in order to latch the holder to the shield pipe, it is necessary to form a mounting hole on the circumferential wall of the shield pipe in addition to providing a projection on the outer circumferential surface of the main body portion of the holder. Therefore, not only does the structure of the holder becomes complicated, but also the shield pipe needs to be bored.

An exemplary aspect of the disclosure provides a wire harness capable of regulating a length of an electric wire drawn out with a simple configuration.

A wire harness according to an exemplary aspect includes an electric wire, a pipe through which the electric wire is inserted, and a flexible holder that is provided between an end of the pipe and the electric wire, and that holds the electric wire, wherein the holder surrounds the electric wire and is inserted into the end of the pipe, and the end of the pipe is crimped and the holder is flexurally deformed, whereby an inner circumferential surface of the pipe and an outer circumferential surface of the holder are brought into intimate contact with each other, and an inner circumferential surface of the holder and an outer circumferential surface of the electric wire are brought into intimate contact with each other.

With this configuration, the end of the pipe is crimped and the holder is flexurally deformed, whereby the inner circumferential surface of the pipe and the outer circumferential surface of the holder are brought into intimate contact with each other, and the inner circumferential surface of the holder and the outer circumferential surface of the electric wire are brought into intimate contact with each other. As a result, displacement of the holder with respect to the pipe is restricted, and displacement of the electric wire with respect to the holder is restricted. Accordingly, the length of the electric wire drawn out from the end edge of the pipe is regulated. Therefore, the drawn out length of the electric wire can be regulated with a simple configuration.

In the above wire harness, it is preferable that a fastener that fastens an outer circumferential surface of the end of the pipe is provided on the outer circumferential surface of the end of the pipe.

With this configuration, the outer circumferential surface of the end of the pipe is fastened by the fastener provided on that outer circumferential surface. For this reason, the intimate contact state between the pipe and the holder and the intimate contact state between the holder and the electric wire can be maintained. Therefore, it is possible to effectively inhibit the length of the electric wire drawn out from the pipe from being changed.

Further, for example, when a shield member such as a braided member having an electromagnetic shield function is fixed to the outer circumferential surface of the end of the pipe, the fixing of the shield member and the fastening of the end of the pipe can be performed by one fastener.

In the above wire harness, it is preferable that a groove extending along a circumferential direction of the holder is provided on an outer circumferential surface of the holder, and a crimped portion of the end of the pipe is engaged with the groove.

With this configuration, by crimping the end of the pipe, the crimped portion of the end is engaged with the groove of the main body portion. As a result, relative displacement of the holder in the axial direction of the pipe can be restricted, and the holder can be appropriately positioned.

In the above wire harness, the holder may include a flange that is located outside the pipe and covers an end edge of the pipe.

With this configuration, because the end edge of the pipe is covered by the flange of the holder, it is possible to inhibit the electric wire drawn out from the end of the pipe from coming into contact with the end edge of the pipe. Accordingly, the electric wire can be inhibited from being damaged by coming into contact with the end edge of the pipe.

In the above wire harness, the holder has a tubular shape, a pair of separation surfaces extending along an axial direction and separable from each other are provided in a portion of the holder in a circumferential direction, and the separation surfaces abut against each other due to the end of the pipe being crimped and the holder being flexurally deformed.

With this configuration, the end of the pipe is crimped and the holder is flexurally deformed, whereby the pair of separation surfaces of the holder abut against each other. As a result, further bending deformation of the holder is restricted. Accordingly, deformation of the electric wire due to the holder being excessively flexurally deformed of the holder can be inhibited.

In the above wire harness, the holder is formed by a pair of half bodies each having a half-tube shape, and both end surfaces in a circumferential direction of the pair of half bodies abut against each other due to the end of the pipe being crimped and the holder being flexurally deformed.

With this configuration, because the holder is formed by a pair of half bodies each having a half-split tubular shape, the holder can be attached to sandwich the electric wire inserted through the pipe from the outer circumferential side. As a result, the holder can be easily attached to the electric wire. In addition, because both end surfaces of the pair of half bodies in the circumferential direction abut against each other, it is possible to reduce deformation of the electric wire due to the holder being excessively flexurally deformed.

According to the present disclosure, the drawn out length of an electric wire can be regulated with a simple configuration.

DETAILED DESCRIPTION OF EMBODIMENTS

Hereinafter, an embodiment will be described with reference to FIGS. 1 to 6.

Figure 1:
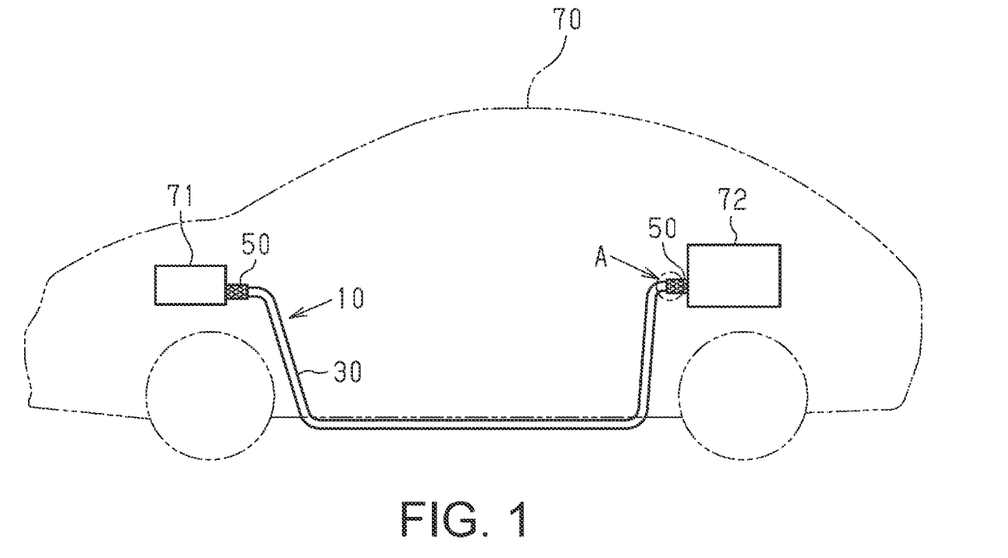
FIG. 1 is a side view of a wire harness according to an embodiment of the present disclosure in a state in which the wire harness is routed in a vehicle.

As shown in FIG. 1, a wire harness 10 is routed in a path including an underfloor of a vehicle 70 such as a hybrid vehicle or an electric vehicle, and electrically connects a device 71 disposed in a front portion of the vehicle 70 and a device 72 disposed in a rear portion of the vehicle 70.

Figure 2:
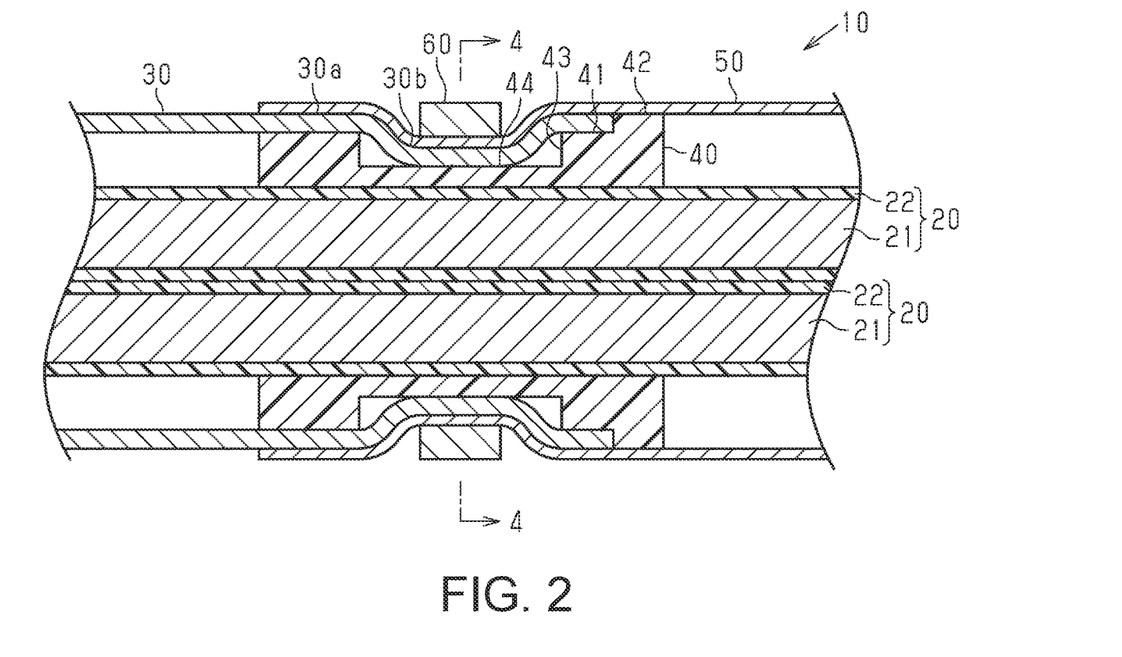
FIG. 2 is an enlarged cross-sectional view of a portion A of the wire harness of FIG. 1.

As shown in FIG. 2, the wire harness 10 includes a plurality of (two in the present embodiment) electric wires 20, a pipe 30 through which the two electric wires 20 are inserted, and holders 40 provided at both end portions of the pipe 30 and collectively hold the two electric wires 20.

As shown in FIGS. 1 and 2, shield members 50 are provided on the outer circumferential surfaces of both end portions of the pipe 30 to electromagnetically shield the portion between the pipe 30 and the device 72 (71). The shield members 50 are electrically connected to the device 72 (71).

The electric wires 20 each have a core wire 21 and a tubular insulating covering 22 that covers the outer circumference of the core wire 21. The core wire 21 is formed of, for example, a plurality of metal strands made of a copper alloy. The insulating covering 22 is formed by extrusion molding an insulating material such as polyvinyl chloride (PVC).

As shown in FIGS. 1 and 2, the pipe 30 is made of a conductive metal material such as an aluminum alloy, and is bent into a predetermined shape corresponding to the routing path of the electric wires 20.

Because the configuration around both end portions of the pipe 30 is basically the same, the configuration around one end portion (the right end portion in FIG. 1) of the pipe 30 will be described below, and the configuration around the other end portion (the left end portion in FIG. 1) will not be described.

As shown in FIG. 2, the holder 40 for holding the electric wires 20 is fitted in one end portion 30a of the pipe 30. The holder 40 is made of a resin material and has flexibility.

Figure 3:
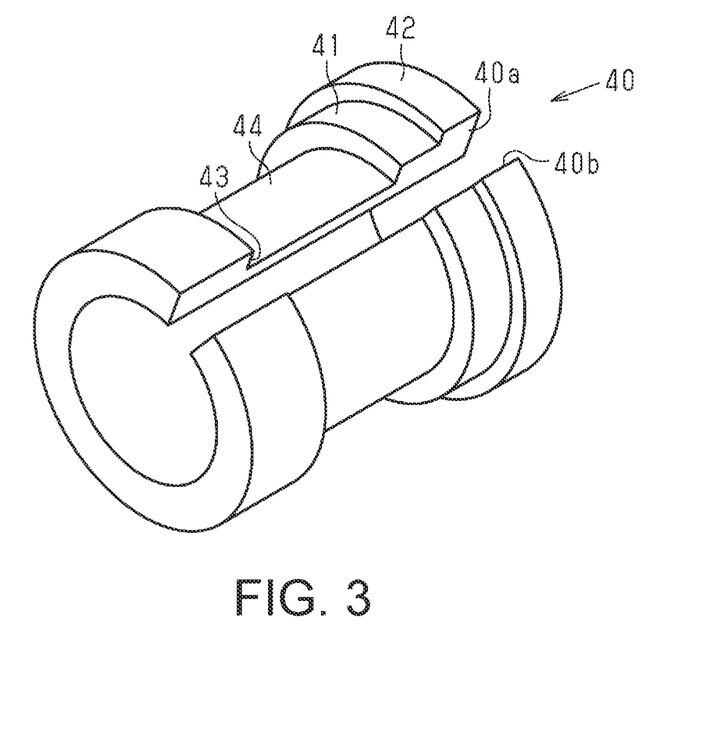
FIG. 3 is a perspective view showing a holder of the embodiment.
Figure 4:
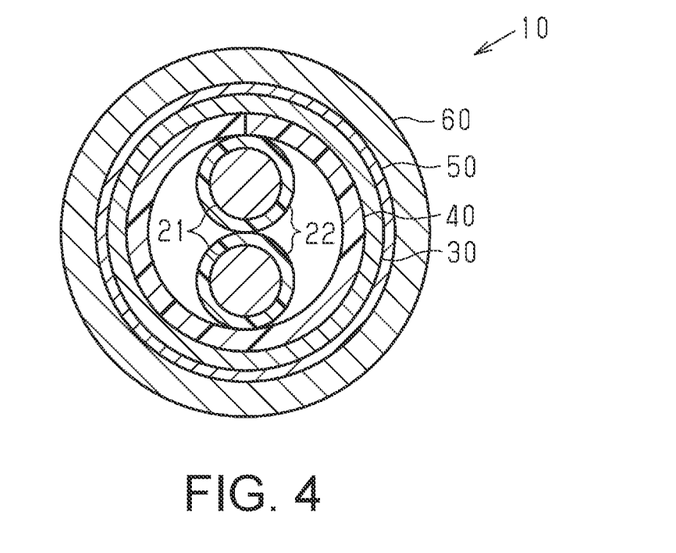
FIG. 4 is a cross sectional view of the wire harness taken along line 4-4 of FIG. 2.

As shown in FIGS. 2 and 3, the holder 40 includes a main body portion 41 (main body) having a substantially cylindrical shape, and a flange portion 42 (flange) protruding from one end (the right end in FIG. 2) of the main body portion 41 toward the outer circumferential side around the entire circumference. The inner diameter of the holder 40 is larger than the sum of the diameters of the two electric wires 20 (see FIG. 6).

A groove portion 43 (groove) extending along the circumferential direction of the main body portion 41 is provided around the entire outer circumferential surface of the main body portion 41. The width of the groove portion 43, that is, the length of the groove portion 43 in the axial direction, is constant around the entire circumference.

As shown in FIG. 3, a pair of separation surfaces 40a and 40b, which extend along the axial direction of the holder 40 and can be separated from each other, are provided in a portion of the circumferential direction of the holder 40.

As shown in FIG. 2, in a state where the entire main body portion 41 is internally fitted to the one end portion 30a of the pipe 30, the flange portion 42 covers the entire circumference of the end edge of the one end portion 30a of the pipe 30. The outer surface of the flange portion 42 is substantially flush with the outer surface of the one end portion 30a of the pipe 30.

As shown in FIG. 1, the shield member 50 is made of, for example, a braided member in which conductive strands made of an aluminum alloy or the like are braided into a tubular shape, and has flexibility. The shield member 50 covers the outer circumferential surface of the one end portion 30a of the pipe 30, and is fastened to the one end portion 30a by a fastening member 60 (fastener). More specifically, an engagement portion 30b formed by being crimped to a bottom surface 44 of the groove portion 43 of the holder 40 is provided around the entire circumference of a portion of the one end portion 30a of the pipe 30. The shield member 50 is fixed to the outer circumferential surface of the engagement portion 30b by the fastening member 60. The fastening member 60 is, for example, a known metal band made of a metal material.

Next, an assembling procedure of the holder 40 and a holding mode of the electric wires 20 by the holder 40 will be described.

Figure 5:
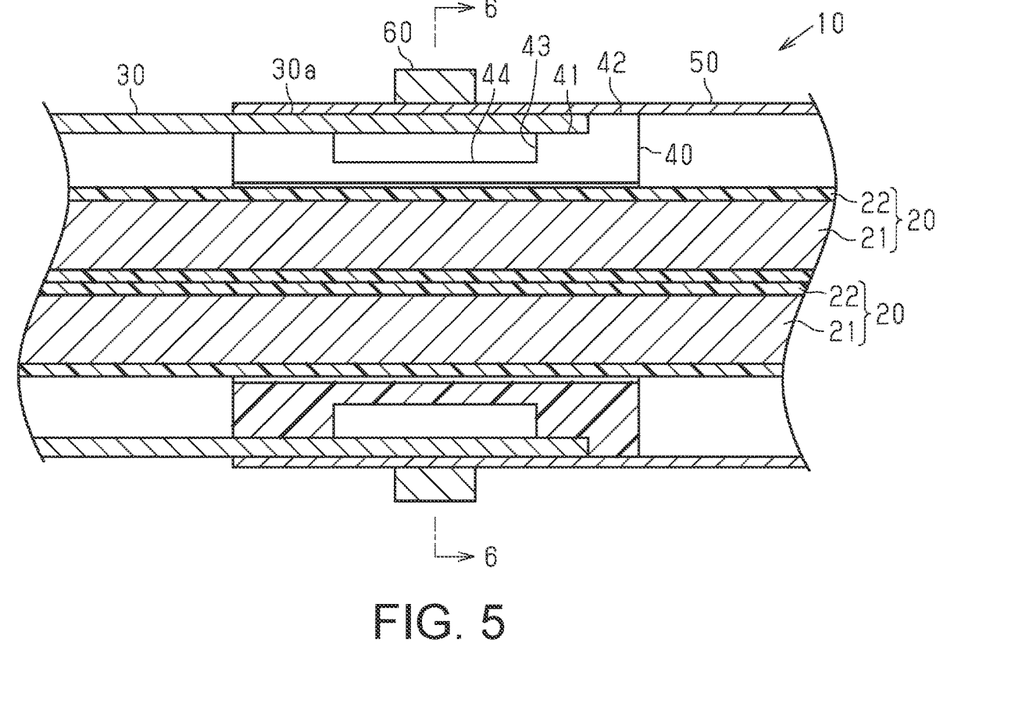
FIG. 5 is a cross-sectional view corresponding to FIG. 2, and shows the wire harness in a state before the holder is flexurally deformed.
Figure 6:
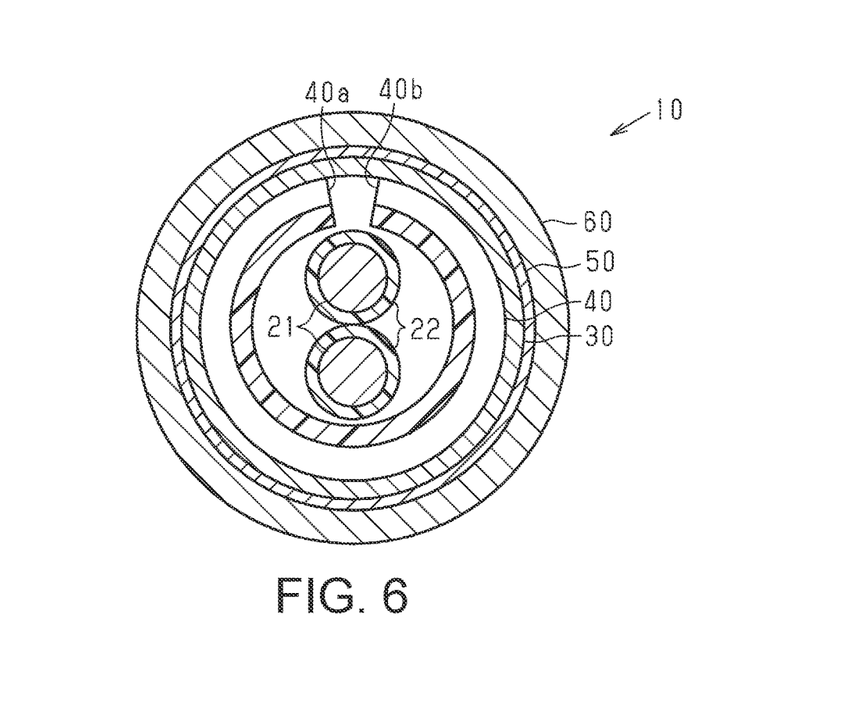
FIG. 6 is a cross-sectional view of the wire harness taken along line 6-6 of FIG. 5.

First, as shown in FIG. 5, the main body portion 41 of the holder 40 is inserted into the one end portion 30a of the pipe 30 through which the two electric wires 20 are inserted. At this time, the flange portion 42 of the holder 40 and the end edge of the one end portion 30a of the pipe 30 abut against each other, whereby the end edge is covered with the flange portion 42.

Subsequently, the shield member 50 is disposed to surround the outer circumferential surface of the one end portion 30a of the pipe 30. Then, the fastening member 60 is attached to the outer circumferential surface of the shield member 50 at a position corresponding to the groove portion 43 of the holder 40.

Subsequently, the fastening member 60 is fastened to the groove portion 43 of the holder 40. As a result, the engagement portion 30b formed by crimping the one end portion 30a of the pipe 30 toward the inner circumferential side is engaged with the groove portion 43. At this time, the shield member 50 is deformed around the outer circumferential surface of the engagement portion 30b. Here, in a state where the inner circumferential surface of the engagement portion 30b abut against the bottom surface 44 of the groove portion 43, the inner diameter of the holder 40 is larger than the sum of the diameters of the two electric wires 20. Accordingly, the electric wires 20 are not held by the holder 40.

Subsequently, as shown in FIG. 2, the outer circumferential surface of the groove portion 43 of the holder 40 is fastened by further fastening the fastening member 60, the inner diameter of the holder 40 is reduced by the bending deformation of the holder 40, and the separation surfaces 40a and 40b abut against each other. As a result, the electric wires 20 are held by the holder 40.

The operation and effects of the present embodiment will be described.

(1) A wire harness 10 includes electric wires 20, a pipe 30 through which the electric wires 20 are inserted, and a flexible holder 40 that is provided between an end portion of the pipe 30 and the electric wires 20 and holds the electric wires 20. The holder 40 surrounds the electric wires 20 and is inserted into the end portion of the pipe 30, and due to/by the end portion of the pipe 30 being crimped and the holder 40 being flexurally deformed, the inner circumferential surface of the pipe 30 and the outer circumferential surface of the holder 40 are brought into intimate contact with each other, and the inner circumferential surface of the holder 40 and the outer circumferential surfaces of the electric wires 20 are brought into intimate contact with each other.

With this configuration, the end portion of the pipe 30 is crimped and the holder 40 is flexurally deformed, whereby the inner circumferential surface of the pipe 30 and the outer circumferential surface of the holder 40 are brought into intimate contact with each other, and the inner circumferential surface of the holder 40 and the outer circumferential surfaces of the electric wires 20 are brought into intimate contact with each other. As a result, displacement of the holder 40 with respect to the pipe 30 is restricted, and displacement of the electric wires 20 with respect to the holder 40 is restricted. Accordingly, the length of the electric wires 20 drawn out from the end edge of the pipe 30 is regulated. Therefore, the drawing length of the electric wires 20 can be regulated with a simple configuration.

(2) A shield member 50 is provided on the outer circumferential surface of each end portion of the pipe 30, and a fastening member 60 that fastens the outer circumferential surface of the end portion of the pipe 30 is provided on the outer circumferential surface of the shield member 50.

With this configuration, the outer circumferential surface of the end portion of the pipe 30 is fastened by the fastening member 60 provided on that outer circumferential surface. For this reason, the intimate contact state between the pipe 30 and the holder 40 and the intimate contact state between the holder 40 and the electric wires 20 can be maintained. Therefore, it is possible to effectively prevent the length of the electric wires 20 drawn out from the pipe 30 from being changed.

Further, when the shield member 50 is fixed to the outer circumferential surface of the end portion of the pipe 30 by the fastening member 60, the fixing of the shield member 50 and the fastening of the end portion of the pipe 30 can be performed by one fastening member 60.

(3) A groove portion 43 extending along a circumferential direction of the holder 40 is provided on an outer circumferential surface of the holder 40, and an engagement portion 30b of the end portion of the pipe 30 is engaged with the groove portion 43.

With this configuration, by crimping the end portion of the pipe 30, the engagement portion 30b of the end portion is engaged with the groove portion 43 of a main body portion 41 of the holder 40. As a result, relative displacement of the holder 40 in the axial direction of the pipe 30 can be restricted, and the holder 40 can be appropriately positioned.

(4) The holder 40 includes a flange portion 42 that is located outside the pipe 30 and covers an end edge of the pipe 30 over the entire circumference.

With this configuration, because the end edge of the pipe 30 is covered by the flange portion 42 of the holder 40 over the entire circumference, it is possible to prevent the electric wires 20 drawn out from the end portion of the pipe 30 from coming into contact with the end edge of the pipe 30. Accordingly, the electric wires 20 can be prevented from being damaged by coming into contact with the end edge of the pipe 30.

(5) The holder 40 has a tubular shape, a pair of separation surfaces 40a and 40b extending along an axial direction and separable from each other are provided in a portion of the holder 40 in a circumferential direction, and the separation surfaces 40a and 40b abut against each other due to/by the end portion of the pipe 30 being crimped and the holder 40 being flexurally deformed.

With this configuration, the end portion of the pipe 30 is crimped and the holder 40 is flexurally deformed, whereby the pair of separation surfaces 40a and 40b of the holder 40 abut against each other. As a result, further bending deformation of the holder 40 is restricted. Accordingly, deformation of the electric wires due to excessive bending deformation of the holder 40 can be inhibited.

The present embodiment can be modified as follows. The present embodiment and the following modifications can be implemented in combination with each other within a technically consistent range.

In the following modification shown in FIG. 7, the same components as those of the above embodiment are denoted by the same reference numerals, and the corresponding components are denoted by reference numerals to which "100" or "200" is added, thereby omitting redundant description.

Figure 7:
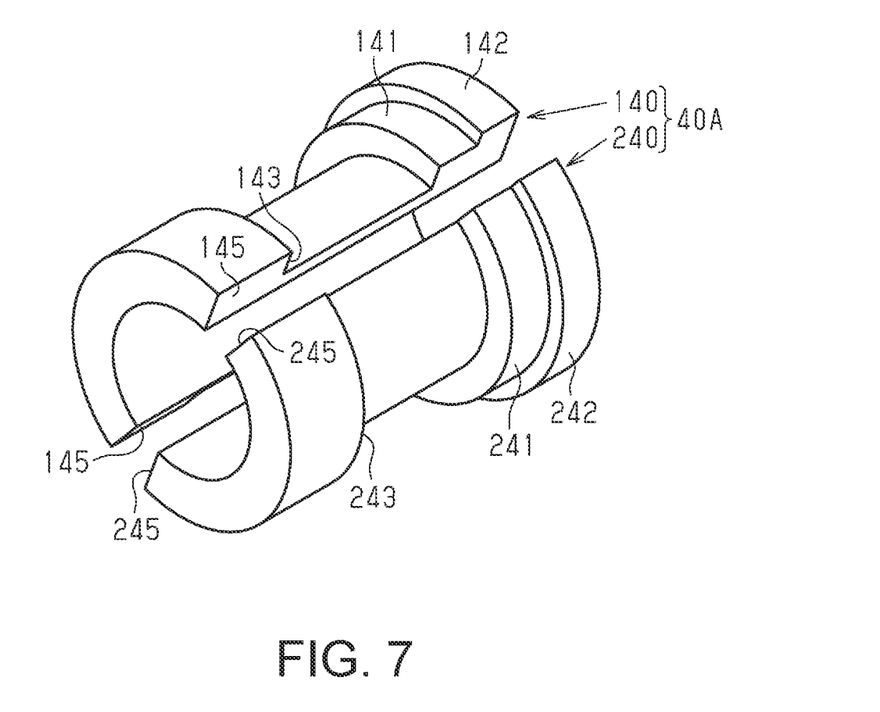
FIG. 7 is a perspective view showing a holder applied to a wire harness of a modification.

As shown in FIG. 7, it is possible to employ a holder 40A constituted by a pair of half bodies 140 and 240 each having a half-tube shape. In such a holder, an end portion of the pipe 30 is crimped and the pair of half bodies 140 and 240 are flexurally deformed, whereby two end surfaces 145 and 245 in the circumferential direction of the pair of half bodies 140 and 240 abut against each other. With this configuration, because the holder 40A in constituted by the pair of half bodies 140 and 240 each having a half-split tubular shape, the holder 40A can be attached to sandwich the electric wires 20 inserted through the pipe 30 from the outer circumferential side. As a result, the holder 40A can be easily attached to the electric wires 20. In addition, because the two end surfaces 145 and 245 in the circumferential direction of the pair of half bodies 140 and 240 abut against each other, it is possible to reduce deformation of the electric wires 20 due to excessive bending deformation of the holder 40A.

As long as the holder 40 is brought into intimate contact with the electric wires 20, the holder 40 does not need to be flexurally deformed to such an extent that the pair of separation surfaces 40*a* and 40*b* of the holder 40 abut against each other.

At least one of the pair of separation surfaces 40*a* and 40*b* of the holder 40 may also be provided with an elastic member such as rubber or resin foam. With this configuration, even in a case where the degree of the bending deformation of the holder 40 varies with a change in the diameter or the number of electric wires 20, the elastic member is compressively deformed in accordance with the degree of the bending deformation, and thus it is possible to suppress the holder 40 from being flexurally deformed more than necessary. Therefore, the same holder 40 can be applied to the above change.

Both end portions of the holder 40 in the circumferential direction may also protrude inward in the radial direction. With this configuration, even in a case where the holder 40 is not uniformly flexurally deformed inward in the radial direction, that is, even in a case where the positions of both end portions in the radial direction are shifted from each other during the bending deformation, the two end portions abut against each other. As a result, it is possible to effectively prevent the holder 40 from being excessively deformed.

The holder 40 may also be made of a metal material. In this case, if a chamfered portion or a protective member is provided on the inner edge portion of the flange portion 42, it is possible to prevent the electric wires 20 from being damaged due to coming into contact with the end edge of the holder 40.

In the present embodiment, the engagement portion 30*b* of the end portion of the pipe 30 is engaged with the groove portion 43 of the holder 40, but the end portion including the end edge of the pipe 30 may also be crimped toward the inner circumferential surface side to be engaged with the groove portion 43.

As the fastening member 60, a well-known binding band made of a resin material may also be employed.

The fastening member 60 may also be omitted. In this case, instead of the shield member 50 that collectively electromagnetically shields the electric wires 20 as in the present embodiment, a shield member that individually electromagnetically shields the electric wires 20 may be employed.

The groove portion 43 of the holder 40 may also be provided in a portion of the main body portion 41 in the circumferential direction.

The holder 40 may also be provided at one of the two end portions of the pipe 30.

The number of electric wires 20 inserted into the pipe 30 may also be one, or three or more.

The holder 40 may also be made of an elastic member such as elastomer. In this case, the holder 40 preferably has a cylindrical shape. Also, similarly to the holder 40 of the present embodiment, this holder may also be provided with a pair of separation surfaces extending along the axial direction.

As long as the holder 40 is in intimate contact with the electric wires 20, the end portion of the pipe 30 does not need to be flexurally deformed around the entire circumference.

The present disclosure encompasses any combination of the following components. Reference numerals are provided for the purpose of assisting understanding, not for limitation.

One aspect of the present disclosure is directed to a holder (40) for holding an electric wire (20) of a wire harness (10) within a metal pipe (30) of the wire harness (10) to reduce or prevent relative movement of the electric wire (20) and the metal pipe (30) in at least a longitudinal axis direction of the electric wire (20). The holder (40) may also be a single piece made of synthetic resin that is elastically deformable between a first state (FIGS. 3 and 6), which may be a natural and uncompressed state, and a second state (FIG. 4), which may be a compressed state.

The holder (40) in the first state may also be an open tube or an open loop having a slit-like space (40*a* and 40*b*) extending in the longitudinal axis direction across a radially outer side surface, a radially inner side surface, and two open end portions, and the holder (40) in the second state may also be a closed tube or a closed loop in which the holder (40) is elastically compressed so that the slit-like space (40*a* and 40*b*) is closed, and the radially outer side surface, the radially inner side surface, and the two open end portions of the holder (40) are continuous in the circumferential direction.

The radially outer side surface of the holder (40) may include a first radially outer side surface portion (41) configured to directly contact a radially inner side surface of the metal pipe (30) at least when the holder (40) is in the first state. The radially outer side surface of the holder (40) may include a second radially outer side surface portion (44) different from the first radially outer side surface portion (41). The second radially outer side surface portion (44) may be spaced radially inwardly from a radially inner side surface of the metal pipe (30) at least when the holder (40) is in the first state, and an annular space may be formed between the second radially outer side surface portion (44) and the radially inner side surface of the metal pipe (30) at least when the holder (40) is in the first state.

The annular space may allow a predetermined portion (30*b*) of the metal pipe (30) surrounding the annular space to be plastically deformed radially inward by an external force, and the plastically deformed predetermined portion (30*b*) of the metal pipe (30) may press the second radially outer side surface portion (44) of the holder (40) to elastically deform the holder (40) into the second state.

The radially outer side surface of the holder (40) may include a third radially outer side surface portion different from the first radially outer side surface portion (41) and the second radially outer side surface portion (44). The third radially outer side surface portion (42) of the holder (40) may be a radially outer side surface of one of the two open end portions of the holder (40).

The first radially outer side surface portion (41) of the holder (40) may have a first diameter, and the second radially outer side surface portion (44) of the holder (40) may have a second diameter smaller than the first diameter.

The third radially outer side surface portion (42) of the holder (40) may have a third diameter larger than the first diameter, and the first radially outer side surface portion (41) and the third radially outer side surface portion (42) may be configured to form a height gap therebetween.

The height gap between the first radially outer side surface portion (41) and the third radially outer side surface portion (42) of the holder (40) may be configured to abut against an open end surface of the metal pipe (30) to cover the open end surface of the metal pipe (30).

The radially inner side surface of the holder (40) may be configured not to press the radially outer side surface of the electric wire (20) radially inwardly or not to directly come into contact with the radially outer side surface of the electric wire (20) when the holder (40) is in the first state. The radially inner side surface of the holder (40) may be configured to directly come into contact with at least a portion of the radially outer side surface of the electric wire (20) and to press the at least a portion of the radially outer side surface of the electric wire (20) radially inwardly when the holder (40) is in the second state.

It will be apparent to those skilled in the art that the present disclosure may also be embodied in other specific forms without departing from the spirit or essential characteristics thereof. Some of the components described in the embodiment (or one or more modes thereof) may be omitted, or some components may also be combined. The scope of the present disclosure should be determined with reference to the appended claims, along with the full scope of equivalents to which such claims are entitled.

The invention claimed is:

1. A wire harness comprising:
    an electric wire;
    a pipe through which the electric wire is inserted; and
    a flexible holder that is provided between an end of the pipe and the electric wire, and that holds the electric wire, wherein:
        the holder surrounds the electric wire and is inserted into the end of the pipe,
        a groove extending along a circumferential direction of the holder and facing an inner circumferential surface of the pipe is provided on an outer circumferential surface of the holder, and
        the end of the pipe is crimped and the holder is flexurally deformed, whereby the inner circumferential surface of the pipe and the outer circumferential surface of the holder are brought into intimate contact with each other, and an inner circumferential surface of the holder and an outer circumferential surface of the electric wire are brought into intimate contact with each other, a crimped portion of the end of the pipe being reduced in diameter inward in a radial direction of the pipe and being engaged with the groove of the holder.

2. The wire harness according to claim 1, wherein a fastener that fastens an outer circumferential surface of the end of the pipe is provided on the outer circumferential surface of the end of the pipe.

3. The wire harness according to claim 1, wherein the holder includes a flange that is located outside the pipe and covers an end edge of the pipe.

4. The wire harness according to claim 1, wherein the holder has a tubular shape,
    a pair of separation surfaces extending along an axial direction and separable from each other are provided in a portion of the holder in the circumferential direction, and
    the separation surfaces abut against each other due to the end of the pipe being crimped and the holder being flexurally deformed.

5. The wire harness according to claim 1, wherein the holder is formed by a pair of half bodies each having a half-tube shape, and
    both end surfaces in a circumferential direction of the pair of half bodies abut against each other due to the end of the pipe being crimped and the pair of half bodies being flexurally deformed.

6. The wire harness according to claim 1, wherein the holder has a cylindrical main body, and an outer circumferential surface of the main body is in contact with the inner circumferential surface of the pipe on both sides of the groove.

7. The wire harness according to claim 1, wherein a portion of a bottom surface of the groove is separated from the inner circumferential surface of the pipe, and a space is formed between the portion of the bottom surface of the groove and the inner circumferential surface of the pipe.

8. The wire harness according to claim 1, wherein the groove is provided in the holder at a predetermined depth, the predetermined depth of the groove is greater than a wall thickness of the pipe, and the predetermined depth of the groove is equal to or greater than a flexural deformation depth of the pipe.

9. The wire harness according to claim 1, wherein in a cross-sectional view of the wire harness, a portion of the inner circumferential surface of the holder is in contact with a portion of the outer circumferential surface of the electric wire over the entire length of the holder.

\* \* \* \* \*